UNITED STATES PATENT OFFICE.

WARREN IDDINGS, OF WARREN, OHIO.

IMPROVEMENT IN EMBALMING DEAD BODIES.

Specification forming part of Letters Patent No. 30,576, dated November 6, 1860.

*To all whom it may concern:*

Be it known that I, WARREN IDDINGS, of Warren, in the county of Trumbull and State of Ohio, have invented a new and useful Improvement in the Process of Embalming the Human Body; and I do hereby declare that the following is a full and exact description thereof.

My invention consists in a new and improved mode of embalming or preserving the human body after death.

My invention or mode of embalming embraces both external treatment and the injection of substances into the blood-vessels. I prefer commencing by injecting through the aorta, as follows: Open the chest by an incision along the sternum, commencing near the clavicle. This incision may be kept open by a screw or other suitable means. Then open the pericardium, and having thus reached the aorta inject into the latter a mixture composed as follows: creosote, two quarts; alcohol, two quarts; arsenic, one pound; camphor and oil of cloves, half a pound each. This mixture may be injected by a forcing-pump or syringe inserted into an incision in the aorta. When the injection is completed the escape of the mixture must be prevented by a ligature upon the artery each side of the incision.

When the above-mentioned injecting of the arteries is completed the following preparation is applied externally: gum myrrh, eight pounds; aloes, eight pounds; arsenic, twelve pounds; gum-camphor and powdered cloves three pounds. Having pulverized these substances thoroughly, add alcohol sufficient to make a thick paste. Now apply this paste externally, covering the entire surface of the body an inch in thickness, and secure the same in place by carefully swathing the body with bandages, cut, say, two inches in width, from cotton or linen cloth, or other suitable material. It is better to swathe the limbs first, and then the body to the neck.

For covering the face and neck I make the following preparation: arsenic, four pounds; Camphor, one pound. Mix these with alcohol and apply the resulting compound to the neck and face. Over this apply a mixture of myrrh and aloes until the covering is an inch in thickness. Then swathe the neck and face in the same manner as the rest of the body. After three months, the covering of the face may be removed and the face exposed.

If the weather be cold at the time of embalming, the body should be placed in a warm bath before injecting the arteries.

The different steps in this mode of treatment and the proportions of the ingredients may be somewhat varied without departing from my invention, so long as the main treatment and the results are substantially the same.

I am aware that the chemical ingredients above mentioned have been employed in the preservation of animal substances. Therefore I do not claim either the use of the separate ingredients or the separate steps of the process; but I believe that the mode of treatment as a whole is new and a useful improvement in the art of embalming.

Having thus fully described my invention, what I claim and desire to secure by Letters Patent of the United States, is—

The above-described process or mode of embalming, the same consisting of the three steps combined, the different compositions of matter being employed, substantially in the manner and for the purposes set forth.

WARREN IDDINGS.

Witnesses:
C. A. ADAMS,
JEDEDIAH FITCH.